Sept. 7, 1943.   V. H. CONLEY   2,328,954
LIQUID DEPTH INDICATOR SYSTEM
Filed April 18, 1942   4 Sheets-Sheet 2

Inventor
VICTOR H. CONLEY, DECEASED
BY: MARY W. CONLEY, EXECUTRIX

Patented Sept. 7, 1943

2,328,954

UNITED STATES PATENT OFFICE 2,328,954

LIQUID DEPTH INDICATOR SYSTEM

Victor H. Conley, deceased, late of Chicago, Ill., by Mary W. Conley, executrix, Chicago, Ill.

Application April 18, 1942, Serial No. 439,524

17 Claims. (Cl. 73—301)

This invention relates to an improved liquid depth indicating system adapted to conveniently and directly indicate either at the liquid container or at remote stations the depth of the liquid in the container, such, for example, as an automobile gasoline tank, or for indicating the varying levels or depths in the water ballast tanks, or the bilge or steamships, or the like.

It is an object of the invention to provide an improved and simplified form of an electrically controlled liquid level or depth indicating system wherein air or an inert gas from a liquid compressed diaphragm transmits pressure to an inert organic liquid for controlling the operation of a mercury column topped by a quenching liquid column of an inert organic mobile liquid, which is movable into immersing relationship with a heated wire arm of an electric bridge unit to vary the resistance of the wire arm to unbalance the bridge proportions to the pressure transmitted by the diaphragm to obtain the depth of the liquid compressing the diaphragm.

Another object of the invention is to provide a liquid depth indicating system including a body of mercury disposed between inert organic liquid control columns governing the operation of a Wheatstone bridge arrangement, one arm of which is varied in effective length to change the resistance thereof by the operation of one of the control columns to cause operation of an indicating meter to record the level or depth of liquid being measured in a container by means of a bellows for producing a pressure for actuating all of the liquid control columns of the system.

It is also an object of this invention to provide an improved and efficient liquid depth indicating system, for selectively indicating the depth of liquids in a plurality of tanks or containers, said system including for the respective tanks or containers a closed bellows-like control to be acted upon by the liquid content of a tank to cause pressure controlled actuation of an electric translator unit involving a Wheatstone bridge principle and being connected with an adjacently positioned or remote control case which is conveniently operable to selectively give a depth reading of the liquid in a selected tank of a group of tanks, such as the ballast tanks of a steamship.

A further object of the invention is the provision of an improved liquid depth indicating system controlled by a pressure operated device governed by the pressure exerted by a quantity of liquid in a tank being measured, said pressure device being connected with an electric translator unit operable on the Wheatstone bridge principle and including a bridge arm the effective length of which is varied by the movement of a combination liquid control column, one of the liquids of which is movable to submerge a portion of the arm in amounts directly proportional to the amount of liquid in the tank to produce an unbalanced circuit and cause operation of an indicating meter to show the level or the depth of liquid in the tank being measured.

It is furthermore an object of this invention to provide an improved liquid depth indicating system for selectively measuring the depth of liquids in a plurality of separated tanks or containers, said system being readily adaptable for use in connection with measuring liquid in ballast tanks of ships and for other purposes. The system includes a plurality of protected bellows-like units, one for each of the respective tanks, with said units being individually connected up to respective translators, each of which is provided with a pressure controlled mercury column supporting an inert organic liquid column which coacts with one of the arms of a Wheatstone bridge arrangement for varying the effective length of said arm, when heated, depending upon the depth of liquid in a tank being measured, thereby permitting the depth of the liquid in the tank to be readily read on a meter forming part of a master control cabinet to which the various translators are connected and whereby the depth of liquid in the tanks connected with the translators may be selectively read at will by means of a selective dial unit on the master cabinet.

It is a further object of this invention to provide an improved and accurate type of liquid depth indicating system including a selectively operable remote control cabinet which is connected with a liquid control pressure device in a tank by means of a translator unit including a Wheatstone bridge mechanism, one of the arms of which is adapted to have the effective resistance thereof varied by means of a quenching liquid, the movement of which is controlled by a pressure actuated mercury column, the movement of which is controlled by the depth of liquid in the tank by means of the pressure unit in the tank.

Still another object of the invention is to provide a liquid level or depth indicating system, of a multiple type, readily adaptable for use in connection with water ballast tanks or the bilge of steamships, whereby substantially accurate readings may be read at remote stations or at a central station by connecting a common indicating depth meter in a remote control cabinet with various tanks by means of a selective dial unit making it possible to positively select any of the tanks in the system for liquid depth measurement by means of closed circuit mercury control units connected with the indicating meter. The indicating units are respectively connected to individual pressure units in the rsepective tanks so that a pressure unit which is selectively connected in a circuit and operated upon by the liquid in a selected tank causes accurate actuation of a primary organic liquid body on a mercury control column which, in turn, controls the movement of an auxiliary column of an inert fluid to coact with a wire adapted to be heated when in circuit and forming an arm of a Wheatstone bridge arrangement to unbalance a normally balanced circuit adjustment thereof in direct proportion to the amount of fluid in the tank being measured and operate the indicating meter accordingly to cause the meter to indicate the depth of the liquid in the tank being measured.

It is furthermore an object of this invention to provide an improved and accurate form of a liquid depth indicating system wherein a selectively operable master control cabinet is connected with a pressure actuated diaphragm mechanism in a tank in which liquid is to be measured, said diaphragm mechanism and control cabinet being connected by means of an improved translator unit involving a Wheatstone bridge mechanism, one of the arms of which comprises a wire mounted in free air, while another arm comprises a wire which is adapted to have the effective resistance thereof varied by means of a quenching effect produced by a movable column of an inert organic liquid supported on a mercury column, the movement of which is controlled by the pressure produced by the amount of liquid in a tank acting on the diaphragm unit in the tank.

It is an important object of this invention to provide an improved and accurate type of liquid depth indicating system wherein a closed circuit translator unit is disposed between the contents of a container to be measured and a selectively operable master control cabinet including a depth indicating meter adapted to be set at zero reading when the tank is empty to provide a circuit which is in electrical balance and which is thrown off balance by an amount depending upon the quantity of liquid in the tank which acts on a pressure operated diaphragm unit in the tank to simultaneously operate first a pressure transmitting primary liquid body and then superimposed liquid columns, one of mercury and the other of an inert organic liquid, to cause said inert organic liquid to coact with a slightly heated high temperature coefficient wire forming part of a Wheatstone bridge arrangement of the translator unit to quench or submerge a portion of said wire in amounts directly proportional to the liquid in the tank being measured to cause unbalancing of the Wheatstone bridge balanced circuit by changing the effective resistance of the partially quenched wire thereby permitting the change in resistance caused by the unbalancing of the Wheatstone bridge circuit to be read on the indicating meter at the remote control cabinet thereby permitting a substantially instantaneous reading to be obtained of the liquid depth in a selected tank.

Other and further important objects of this invention will be apparent from the disclosures in the specification and the accompanying drawings.

The invention, in a preferred form, is illustrated in the drawings and hereinafter more fully described.

This invention relates to an improved and simplified form of a liquid level or depth indicating system conveniently adapted for use in selectively measuring the depth of liquid in a series of tanks or containers, such as the water ballast tanks of a ship, by means of a remote control cabinet which may be located in the pilot house or any other convenient place on a ship, said control cabinet being connected with the various ballast tanks of the ship by means of a plurality of translator units, one for each of the tanks, said translator units being mounted within a constant temperature translator cabinet, which may be mounted in the pilot house or in any other convenient location on one of the upper decks of the ship. The respective translator units are, in turn, individually connected to a pressure control diaphragm unit supported slightly above the bottom of the respective tank in position to be operated on by the pressure exerted by the liquid content of the tank.

Figures 1, 2, 3:
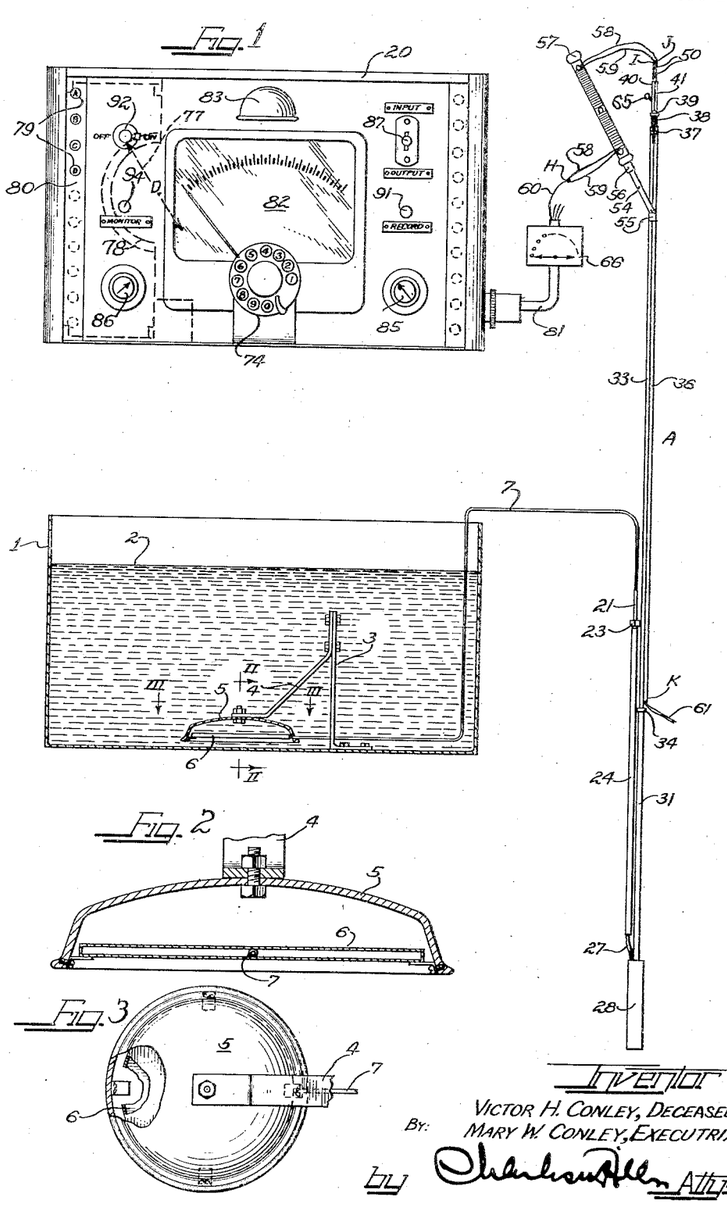
Figure 1 illustrates a schematic arrangement, partly in elevation and partly in section, of a multiple type of a liquid level depth indicating system embodying the principles of this invention and applied to a plurality of liquid containing compartments or tanks such as the water ballast tanks of a ship, for the purpose of readily ascertaining the level or depth of the contents of the various tanks selectively, by a selective operation of a remote control cabinet through a particular translator unit connected with a diaphragm control means within the tank selected to be measured.
Figure 2 is an enlarged vertical sectional view of the pressure actuated diaphragm unit taken on line II—II of Figure 1.
Figure 3 is a fragmentary top elevational view of the pressure control diaphragm unit taken on line III—III of Figure 1.

In order to simplify the description of the liquid level depth system, the description will be confined primarily to the schematic form of the system illustrated in Figure 1 directed to a single translator unit and its respective diaphragm mechanism mounted within a particular tank. A translator cabinet, however, is illustrated for a multiple system including four translators which are respectively connected with four separate tanks. The group of translators are also connected with a standard type of electric stepping switch mounted in the upper portion of the translator cabinet and connected with the selectively operable remote control cabinet of the system. It will, of course, be understood that any number of tanks may be included in the system and that the number of diaphragm units and translator units will correspond with the number of tanks.

Referring more particularly to the schematic arrangement illustrated in Figure 1 of the drawings, the reference numeral 1 indicates a container or tank containing a liquid 2, the level or depth of which is to be measured and registered on an indicating meter in the remote control cabinet of the system. Secured on the bottom of the tank or in any other convenient position within the tank is a supporting bracket 3, to which is rigidly secured a supporting arm 4 one end of which is bolted or otherwise secured to the top of a protecting cover or hood 5 constructed of cast iron or other suitable material and held in position a slight distance above the bottom of the tank 1 to permit liquid in the tank to flow upwardly into the hood. Mounted within the protecting cover or hood 5 and clear of the bottom of the tank, is a hollow bellows diaphragm 6 preferably constructed of phosphor bronze or inverse Monel metal. The bellows diaphragm 6 is placed in the tank at the lowest point from which a reading is desired. The hollow bellows diaphragm 6 is filled with air or an inert gas, which, when compressed by the liquid in the tank, is permitted to be forced out of the diaphragm into a small bore copper tube, one end of which is connected to a suitable point in the diaphragm. The pressure tube connected with the diaphragm is designated by the reference numeral 7 and leads upwardly out of the tank 1 and from there is conducted to lead into a translator cabinet 8 which may be situated near the tanks or on an upper deck of the ship where the translator cabinet may be conveniently accessible. The entire translator cabinet 8 is constructed of an insulation material including a door 9 which, when closed, has a tight fit with the cabinet housing. The translator cabinet 8 is provided with a transverse shelf or partition 10 near the upper portion thereof to divide the interior of the cabinet into an upper chamber 11 and a lower translator chamber 12.

Figure 5:
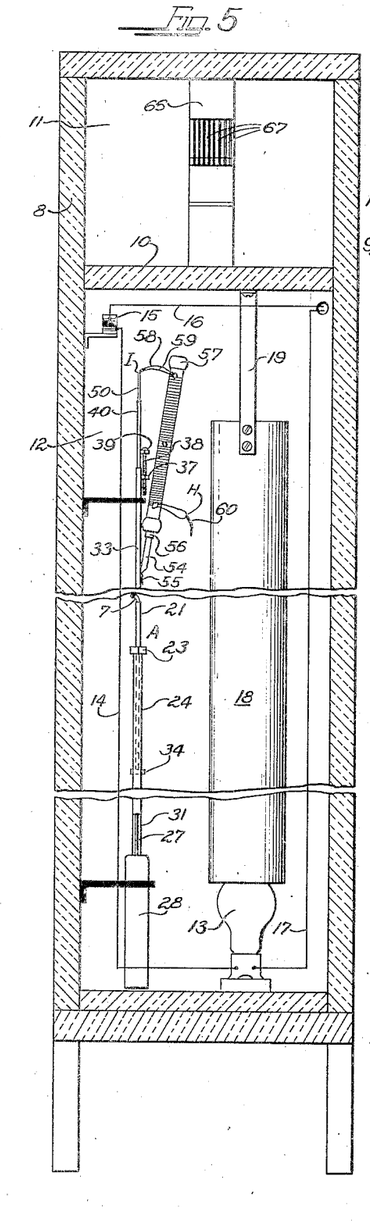
Figure 5 is a vertical sectional view through the insulation translator cabinet taken on line V—V of Figure 4 and illustrating the thermostatic control circuit arrangement for the heating device to control the same for maintaining a predetermined constant temperature within the translator cabinet.

In order to insure a more efficient operation of the system it is desired to maintain a constant temperature within the cabinet. For accomplishing this purpose, an electric bulb or heating unit 13 is mounted on the bottom of the chamber 12. Connected to one terminal of the heating unit 13 is one end of a wire 14, the other end of which is connected to one terminal of a standard type of thermostatic switch 15 mounted within the translator cabinet chamber 12. Connected to the other terminal of the thermostatic switch 15 is one end of a wire 16 which is conducted out of the translator cabinet 8 and is connected to a standard plug which is inserted in an electric power socket. The second terminal of the heating unit 13 has connected thereto one end of a wire 17 which also is conducted out of the cabinet 8 and is connected to the plug to which the wire 16 is attached. For the purpose of causing a proper circulation of the air within the lower chamber 12 of the translator cabinet, an air circulating tube or sleeve 18 is supported by means of a bracket 19, the lower end being positioned over the heating unit 13 to facilitate the proper circulation of the heated air within the compartment 12 of the translator cabinet.

Mounted on suitable insulation brackets on the back wall of the translator cabinet 8 and within the lower chamber 12 thereof are a series of four translator units A, B, C, and D, one for each of four tanks included in a system of liquid containing tanks, the depth of the liquid of which it is desired to be able to quickly read selectively, at either a station adjacent the tanks or at a remote control station, by means of a master control cabinet 20 of the system as installed. While only four translator units are shown in the cabinet 8 in Figure 4, it will, of course, be understood that any number of translators may be provided depending upon the number of tanks in a system requiring liquid depth measurement readings, the number of translators, of course, depending upon the number of tanks, since one translator is required for each of the tanks to be measured.

Since only one translator and tank is illustrated in the schematic diagram illustrated in Figure 1, the details of the translator A will now be described.

Figure 6:
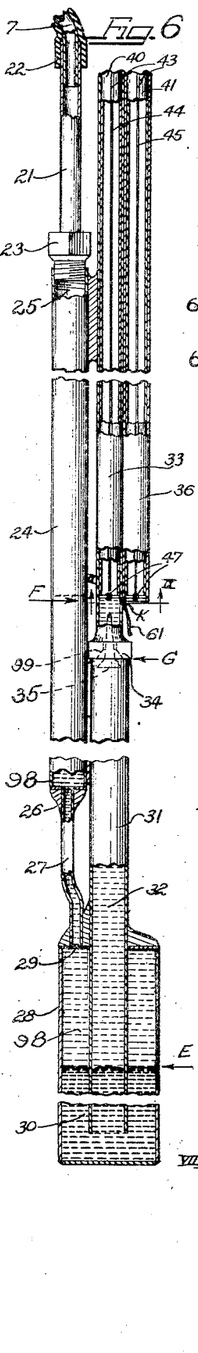
Figure 6 is an enlarged fragmentary elevational and sectional view of the lower portion of one of the translator units and illustrating the normal level of the mercury in the mercury well and the normal level of the column of inert organic liquid supported on the mercury and operable in a stand tube leading from the mercury well.

Referring now to Figures 6 to 10 inclusive, each of the translator units comprises a connecting tube 21 constructed of brass or other suitable material into the upper end of which an end of the pressure conducting tube 7, leading from the diaphragm in the tank 1, projects. A rubber insulation sleeve or collar 22 is engaged around the connection between the tube 7 and the tube 21 to insure an airtight fit between said tubes. The lower end of the connecting tube 21 has an airtight fit with a coupling nut 23 which, in turn, is tightly threaded into the upper end of a pressure stabilizing tube or pipe 24. The pressure equalizing pipe 24 provides an expansion chamber 25, the lower end of which communicates with a restricted opening 26 formed in the bottom of the tube 24 in position to communicate with the upper end of a restricted or small diameter steel connecting tube 27, the upper end of which is soldered or otherwise rigidly secured to the bottom of the expansion tube 24. The lower end of the small diameter connecting tube 27 is soldered or otherwise rigidly secured to the upper end of a mercury well or manometer 28 to communicate with a pressure inlet opening 29 as indicated in Figure 6. The mercury well or cup 28 contains a quantity of mercury 30 which, when the liquid containing tank 1 is empty, has a normal level indicated by the arrow E (Figure 6).

Engaged in the manometer above the mercury 30 is a quantity of a mobile inert organic liquid 98 which fills the manometer well 28 and projects upwardly filling the restricted tube 27 and extends upwardly into the expansion or pressure stabilizing pipe 24 to form a primary liquid column, the normal level within the pipe 24 being indicated by the arrow F, when the liquid tank 1 is empty. The primary column formed by the liquid 98 serves as a pressure transmitting column for transmitting the pressure from the chamber 25 of the pipe 24 to the mercury 30, and said liquid 98 passing from the pipe 24 through the restricted passage of the tube 27 acts as a dampening medium for stabilizing any turbulent or pulsating pressures which may be transmitted by the diaphragm due to the agitation of the water in the tank 1 caused by the rolling or tossing of the ship or from other causes.

The pressure expansion area in the upper portion of the chamber 25 of the expansion tube 24 is disposed between the pressure transmitting tube 7 and the primary liquid column 98 and is provided for the purpose of assisting the liquid column 98 in minimizing the accidental fluctuations in the diaphragm transmitted air or gas pressures.

Projecting down through the top of the mercury well 28 and rigidly secured to said well by solder or other suitable means is a mercury outlet pipe or tube 31 constructed of stainless steel or other suitable material. The mercury outlet tube 31 extends into the well 28, through liquid head 98, a distance sufficient to permit the lower end of the tube 31 to project into the mercury 30.

The mercury 30 in the well 28 flows upwardly into the lower end of the tube 31 as a mercury column and supports a column of a mobile inert organic liquid 32, such as dimethoxy tetraethylene glycol. The auxiliary or second inert organic liquid column 32 projects upwardly out of the tube 31 into a main tube 33 having a mounting base 34 secured on the upper end of the tube 31. When the liquid tank 1 is empty and the mercury is at normal level E as shown in Figure 6, the normal level of the inert organic liquid auxiliary column 32 is at the same level as the first liquid column 98 as is indicated by the arrow F in the main tube 33.

As liquid is added into the tank 1, pressure is exerted on the diaphragm which, in turn, will be compressed in accordance with the pressure exerted thereon and will transmit the pressure from the tube 7 first into the expansion chamber 25 of pipe 24, then to the liquid 98, and next to the mercury well 28 to cause the mercury to rise in the pipe 31. When the tank is full, the upper end of the mercury column will rise in the tube 31 and extend to the point indicated by the arrow G. At this point the upper end of the mercury column will actuate the needle valve 35 to seat against a valve seat 99 in the base 34 of the pipe 33 to prevent the further rise of the mercury into the tube 33.

Figures 7, 8, 9, 10:
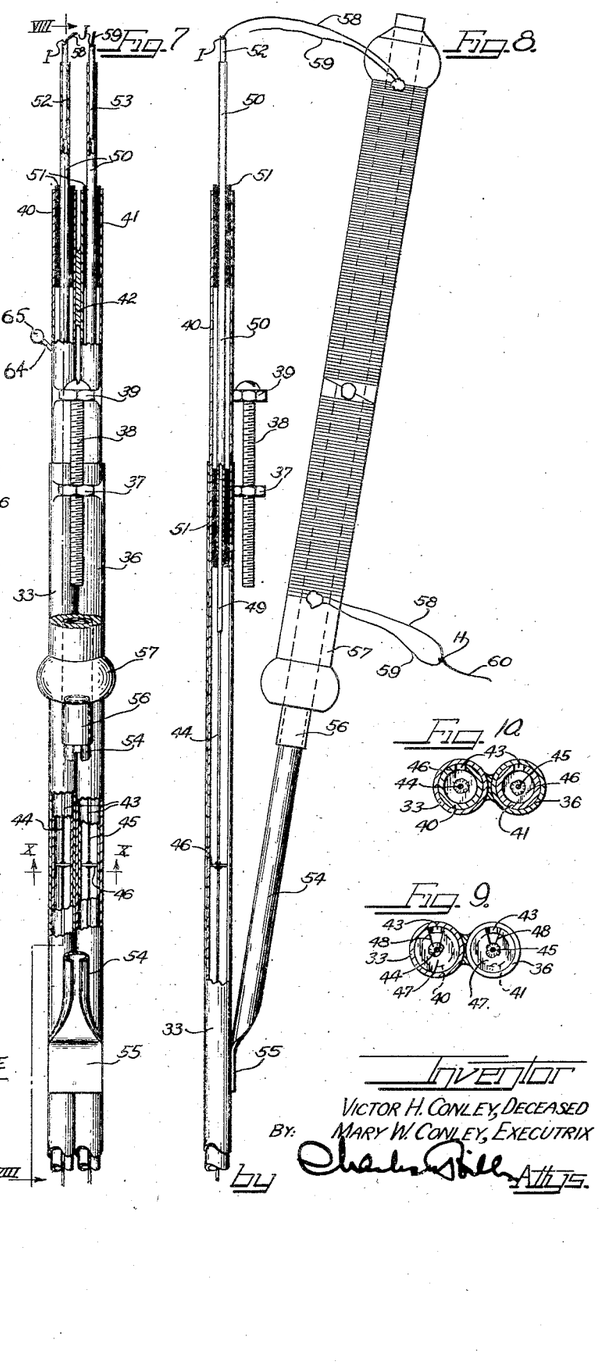
Figure 7 is an enlarged fragmentary elevational and sectional view of the upper portion of one of the translator units with a portion of the Wheatstone bridge mechanism broken away.
Figure 8 is an enlarged fragmentary elevational and sectional view taken substantially along the line VIII—VIII of Figure 7 and showing in elevation the portion of the Wheatstone bridge mechanism omitted in Figure 7.
Figure 9 is an enlarged sectional view taken on line IX—IX of Figure 6 showing the open end of one of the tubes.
Figure 10 is an enlarged transverse sectional view taken on line X—X of Figure 7.

Mounted adjacent the main tube 33 and sweat soldered or otherwise rigidly secured thereto for the entire length is an auxiliary tube 36, the upper end of which is level with the upper end of the tube 33. The lower end of the auxiliary tube 36, however, stops short of the lower end of the tube 33 and is open at the bottom. The two tubes 33 and 36 are constructed of brass or other suitable material and have soldered thereto a nut 37.

Adjustably supported in the twin guide tubes 33 and 36 by means of an adjusting screw 38 and an upper nut 39 is a portion of a Wheatstone bridge. The portion of the Wheatstone bridge mechanism which is slidably mounted in the twin tubes 33 and 36 comprises a pair of tubes 40 and 41 which are slightly spaced apart and have the upper portions thereof connected by a soldered connection 42. The upper nut 39 is also soldered between the two tubes 40 and 41, as shown in Figure 7. Starting at a point below the upper end of each of the tubes 40 and 41 is a longitudinal slot 43 which extends longitudinally downwardly through the lower end of the respective tubes 40 and 41. The two tubes 40 and 41 respectively telescope into the supporting tubes 33 and 36 and are adapted to be held in a set position of adjustment by means of the adjusting screw 38 and the nuts 37 and 39.

Two arms of the Wheatstone bridge are formed by two wires 44 and 45, each having a very high temperature coefficient of resistance and constructed of nickel or other suitable material. To hold the respective Wheatstone bridge wires 44 and 45 axially spaced within the respective tubes 40 and 41, a plurality of spaced mica disks 46 are secured to said wires by means of an insulate cement. Soldered to the lower end of each of the bridge wires 44 and 45 is a metal end disk 47 having a segment of V-shaped notch 48 formed therein to serve as an entrance for the auxiliary column liquid into the tube 40 from the tube 33. The slot 43 in the tube 40 also permits the upper or bridge control fluid column 32 to pass into the tube 40 and furthermore serves as a means for mounting the wire 44 and the spacer disks thereof within the tube 40. The slot 43 in the tube 41 serves as a means for mounting the wire 45 and its disks 46.

Each of the Wheatstone bridge wires 44 and 45 has the upper end thereof soldered or otherwise rigidly secured to the lower end of a nickel rod 49 which, in turn, has the upper end thereof secured in the lower end of a brass tube 50 which projects upwardly out of the upper end of the respective tube 40 or 41. Each of the brass tubes 50 has a pair of insulating tubes 51 cemented thereon to serve as spacing means between the respective tubes 40 and 41 and the brass tubes 50 engaged therein. Rigidly secured in the upper end of the tube 50 associated with the Wheatstone bridge tube 40 is a nickel terminal rod 52. A similar nickel terminal rod 53 is engaged in the upper end of the tube 50 associated with the Wheatstone bridge tube 41.

The second half of the Wheatstone bridge mechanism consists of a split tube supporting bracket 54, the lower end of which is flattened out to form a plate 55 which is soldered or otherwise rigidly secured to the two tubes 33 and 36, as clearly illustrated in Figures 7 and 8. Frictionally engaged over the upper end of the split tube bracket 54 is a brass supporting tube 56, on which a porcelain spool 57 is cemented. The second half of the Wheatstone bridge arrangement comprises two balanced coils 58 and 59 constructed of wire consisting of a copper, nickel and manganese alloy known to the trade as "Manganin." The Wheatstone bridge wires 58 and 59 are coiled in parallel around the porcelain spool 57 (Figure 8) and are held in place at spaced intervals by insulate cement. At the lower end of the spool 57, the two wires 58 and 59 connect up with a common lead wire 60. The point where the Wheatstone bridge wires 58 and 59 join the wire 60 is designated by the letter H, which is one of the four points of the Wheatstone bridge formed by the wires 58, 59, and 44, 45, as more clearly illustrated in the circuit diagram shown in Figure 11. The junction of the bridge wires 58 and 44 is designated by the letter I, and the junction of the bridge wires 59 and 45 is designated by the letter J. The junction of the bridge wires 44 and 45 is indicated by the letter K.

Engaged in the upper part of the tube 33 and communicating with the air chamber in said tube is a small vent or breather tube 64 to allow for breathing. Engaged on the outer end of the breather tube 64 is a bulb or bladder 65 to keep outside air from entering the tube 33 but still allowing barometric pressure to be impressed upon the column of inert organic liquid 32 within the tube 33.

Figure 11:
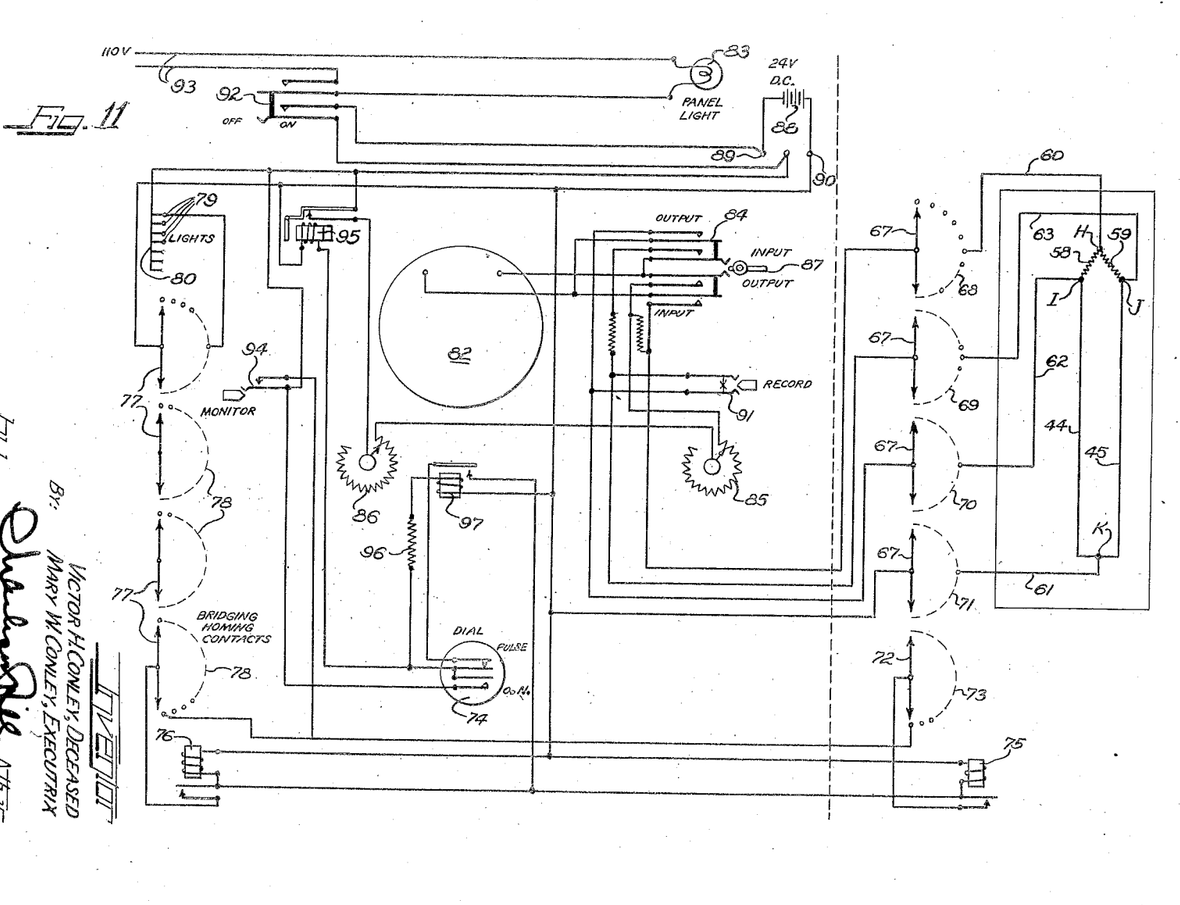
Figure 11 is a circuit diagram for the remote control cabinet and for one of the translator units connected with the cabinet circuit through a selectively operable electric stepping switch unit to which the other translators of the system are also connected.

Referring now to the circuit diagram shown in Figure 11, the Wheatstone bridge terminal K has connected thereto one end of a wire 61. The wires 60 and 61 connect the end terminals H and K of the Wheatstone bridge across the battery or power source of the circuit. Connected to the Wheatstone bridge terminal I is one end of a wire 62, and a wire 63 has one end thereof connected to the Wheatstone bridge terminal J. These are four wires 60, 61, 62, and 63 forming a small cable and leading from each of the translator units mounted in the translator cabinet 8 upwardly through a suitable opening in the partition shelf 10. The four wires of each of the small cables are connected to an Automatic Electric Company's type of standard multiple point, rotary stepping switch 66 mounted in the upper chamber 11 of the cabinet 8.

The main stepping switch 66 includes a plurality of bridging switch wipers 67 which are mounted side by side on a rotatable wiper shaft and coact with a plurality of separate contact levels 68, 69, 70, and 71. An additional homing switch wiper 72 is included in the stepping switch for coaction with a homing level 73 to permit "homing" operation, for automatically returning the wipers to a "home" position after use.

Homing operation of the wipers 67, is accomplished by means of automatic rotation through the medium of the release magnet 75 and the battery 88 which together with the "monitor" switch 94 forms a release circuit. After the wipers have been selectively set by use of the dial type pulsating device 74, the release circuit is closed by manual operation of the "monitor" switch 94. This closing of the release circuit causes the wipers 67 to be rotated toward "home" position, and when said position is reached, a set of "off-normal" springs, forming part of the standard homing type switch, act to open the release circuit when the wipers reach the "home" position, thereby permitting the wipers 67 to remain in "home" position ready for another selective operation by use of the dial device 74.

A similar arrangement is also provided for causing the uppermost wiper 77 of the light control standard homing type of stepping switch to return to "home" position to extinguish the particular indicating light 79 which was lighted when the dial device was operated to make a circuit selection. Homing of the light control upper wiper 77 is accomplished by automatic rotation through the medium of the release magnet 76, the lowermost wiper 77, the level 78 and the battery 88, which together with the "monitor" switch 94 form a release circuit for control of the indicating lights. The closing of the light control release circuit by the manual operation of "monitor" switch 94, causes the lowermost and uppermost wipers 77 to be rotated toward "home" position and when said position is reached a set of "off-normal" springs forming part of the light control stepping switch, act to open the light control release circuit, thereby permitting the wipers 77 to remain in "home" position ready for another selective operation of a light when the dial device 74 is again operated to make another circuit selection for obtaining a liquid depth reading in a selected tank.

The stepping switch permits of a selection of one particular circuit of a group of translator circuits, and said selection is accomplished and controlled by means of a standard type automatic telephone selectively operable impulse sending dial desk unit 74 mounted in the remote control cabinet 20.

Included in the stepping switch 66 is a stepping magnet 75 connected with the homing wiper 72 and with a stepping magnet 76 and also to the lowermost wiper 77 forming part of an indicating light control, automatic standard rotary stepping switch. The light control stepping switch, which includes a plurality of wipers 77 and levels 78, is mounted in the remote control cabinet 20 and selectively governs the operation of a plurality of lettered or numbered indicating lamps or lights 79 for designating the particular tank to be measured for liquid depth and the translator unit connected with the diaphragm unit of the selected tank.

In the light control stepping switch only the lowermost and uppermost wipers 77 and levels 78 are used in the circuit. The intermediate wipers 77 and levels 78 are not used.

The lamps or lights 79 are mounted in a lamp jack strip 80 mounted in the front panel of the control cabinet 20. The number of lights in service depends upon the number of tanks in the system.

The automatic master or main stepping switch 66 mounted in the translator cabinet 8 is connected by means of a cable 81, of suitable capacity, to the remote control cabinet 20, in which a liquid level or depth indicating meter 82 is mounted. A panel light 83 is mounted on the front panel of the cabinet 20 over the meter 82 to illuminate the dial of the meter when the system is in service.

The indicating meter 82 is a double purpose instrument functioning as an ammeter in the battery circuit across the terminals H and K of the Wheatstone bridge, and as a voltmeter in the galvanometer circuit across the terminals I and J of the Wheatstone bridge. A double pole, double throw lever key operated "input" and "output" switch 84, connected in the battery side of the circuit, controls the meter 82. The switch 84 is mounted in the control cabinet 20 and is controlled by a lever key 87 on the front panel of the cabinet 20.

The meter 82 may be used either as an ammeter or a voltmeter and may be connected in the circuit to give either input or output readings. This is done by use of the switch 84. When the switch key 87 is moved to input the meter 82 is connected for use as an ammeter to check on the battery voltage and to measure the input to the translator from the battery. The input reading should read a predetermined amount, say 205 inches on the meter scale. If the meter does not read 205 inches it can be adjusted by adjusting the rheostats 85 and 86. The rheostat 85 is of 26 ohm capacity for coarse adjustments and the rheostat 86 is of 2 ohm capacity to permit of fine adjustments.

The small resistor shunted across the circuit wires connected to the input contacts of the switch 84, is about .1 ohm resistance and is essentially an ammeter shunt for controlling the flow of current to the bridge. The second small resistor connected in the circuit wire connected to one of the output contacts of the switch 84 is about .2 ohm resistance and is used to compensate for variation in line resistance.

The switch key 87, when thrown into the "up" or "input" position, connects two rheostats 85 and 86 in circuit. The rheostat 85 is for coarse control, and the rheostat 86 is for fine adjustments. The rheostat arrangement enables adjusting of the current flowing through a translator unit to a given or selected value to cause proper energization of the Wheatstone bridge forming part of a translator unit in case the bridge should at some time get slightly off balance for some reason during the use of a translator. By throwing the lever key 87 to "input" also permits of a check-up on the voltage of the circuit battery 88 connected across the terminals 89 and 90 of the circuit.

When the switch key 87 is thrown down or into "output" position, the meter 82 is connected across the Wheatstone bridge terminals I and J and acts as a galvanometer for liquid depth reading of the liquid in the tank 1 selected for liquid depth measurement. When the lever key 87 is moved into the "output" position, a push button switch 91, designated "Record," should simultaneously be operated to shunt the meter across the wires connected with the "output" terminals of the switch 84, to permit the meter to be used as a voltmeter thereby causing the meter 82 to indicate the depth of the liquid in inches for a selected tank.

To connect the remote control cabinet 20 in the system, a main control double contact switch 92 is mounted in the cabinet 20. When the switch 92 is in "off" position, both the electric circuit 93 for the meter panel light 83 and the battery circuit for the system are open. To use the system, it is only necessary to move the main switch 92 to "on" position. The panel light circuit 93 will then be closed, as well as the battery circuit for the system. With the closing of the light circuit 93, the panel light 83 will light up to illuminate the face of the instrument panel of the control cabinet.

If one of the indicating lamps or lights 79 in the lamp jack strip 80 on either side of the remote control cabinet panel should happen to be lighted at the beginning of a test operation, the button of a "monitor" switch 94 is pushed in and held down until all buzzing ceases and all of the indicating lamps 79 are extinguished. The buzzing is caused by the wipers of the homing switch moving over the switch contacts when returning to home position.

Connected in the battery circuit is a bridge opening control slow release relay 95, which is connected in parallel with a quick acting relay 97 and its resistor 96. The relays 95 and 97 are connected through the off normal contact spring of the selector dial desk unit 74 to battery, whenever the dial unit is operated. Relay 95 opens the circuit to the bridge to keep all pulses or surges off of the bridge while dialing takes place.

The relay 97 connects the pulsing spring of the dial unit to the magnets of the stepping switches.

Relay 95 holds the bridge circuit open during dialing, to protect the instrument circuit and also does away with sparking at the stepping switch contacts, as the wipers pass over the contacts during the return movement of the dial.

Relay 95 is energized when the dial unit is operated. The movement of the dial causes alternate making and breaking of the off-normal contact spring of the dial unit 74, thereby completing a circuit through the battery for energizing the relays 95 and 97. Relay 95 when thus energized actuates its armature to break the circuit to the bridge. Relay 95 being slow acting does not allow its armature to drop back due to the rapidity with which line relay 97 operates. When the dial makes its return movement, the circuit through the relay 97 is interrupted causing the armature of the relay 97 to drop back as each projection or tooth on the dial is contacted. With each dropping back of the armature of the relay 97 the stepping switch is operated one step. The interruptions due to rotation of the dial are too rapid to permit release of the armature of the relay 95 until the whole series of interruptions has been sent and the shaft of the stepping switch has been rotated the required amount to connect a selected tank in circuit for taking a liquid depth reading.

Figure 4:
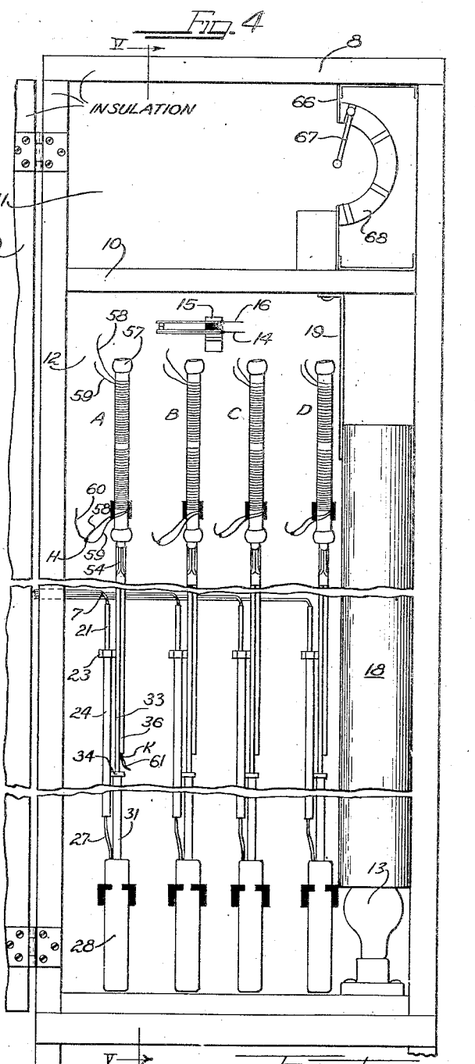
Figure 4 is a fragmentary elevational view of the translator cabinet, with the door in open position, and illustrating the mechanism in the interior of the cabinet arranged for connection with a group of from one to four tanks.

Each of the separate translators in the translator cabinet 8 is connected to its respective diaphragm in a particular tank. The various translators are each connected by a separate small four wire cable leading from the Wheatstone bridge terminals of the translator to the master stepping switch 66 in the upper chamber of the translator cabinet 8. A master cable connects the master stepping switch 66 to the remote control cabinet 20 and said master cable includes eight wires, seven of which are in use while the eighth serves as a spare.

Having described the various mechanisms and the circuit for the liquid depth indicating system, a brief description of the system will now be given. The system is applicable for use with one or with a plurality of liquid containing tanks, with each of the tanks in the system being equipped with a bellows type diaphragm unit mounted in the tank and being connected by the pressure tube with a particular translator unit mounted in a translator cabinet, which may be located near the tanks or at a remote distance therefrom, said cabinet also containing a master electric rotary stepping switch 66 of a standard type and of a selected capacity depending upon the number of tanks with which the system is connected.

In order to insure efficient operation of the system, the temperature within the translator cabinet 8 is maintained at a predetermined constant by means of the thermostatically controlled heating lamp or unit 13 with which the heat circulating tube 18 is associated.

For the purpose of conveniently obtaining substantially instantaneous depth or level reading of the liquid in a selected tank of the system, the remote control cabinet 20 may be conveniently located at any selected distance from the translator cabinet, and if the system is connected with the various ballast tanks of a ship, the control cabinet may be located in the pilot house or in any other convenient place.

With the system installed as described, an operator of the device has merely to determine which of the tanks he wishes to know the liquid depth of. The selection is made by means of the selector dial unit 74. The main control switch 92 is first moved into the "on" position thereby causing lighting of the lamp 83 to illuminate the instrument panel of the cabinet 20 and at the same time close the battery circuit. If, when the main switch is turned on, one of the indicating lamps should be lighted, it is only necessary to push the button of the "monitor" switch 94 and hold the button down until all buzzing ceases and all of the indicating lamps are extinguished.

To select a particular tank for liquid depth measurement, the selector unit 74 is dialed similar to the dialing of a telephone number by simply dialing the particular tank number. This dialing operation will light up the corresponding lamp 79 thereby clearly indicating the tank which is being measured.

In case there are more than ten tanks in the system, the tanks above No. 10 indicated by the lamps in the lamp jack strip, in the right hand side of the cabinet 20, may be selected by dialing the number plus ten.

If it is desired to check on the system, the switch lever key of the "input" and "output" switch 84 is pushed into the "input" position to give a check on the battery voltage and a measure of the input to the translator unit from the battery. In case the meter 82, which is now connected for use as an ammeter, does not give a selected predetermined reading, the meter can be adjusted to the required value by means of the proper adjustment of the coarse control rheostat 85 and the fine adjustment control rheostat 86.

With the checking of the instrument as described, the operator is now ready to obtain the liquid depth reading of the tank being measured. To do this, it is only necessary to move the lever key 87 into the down or "output" position, thereby connecting the meter 82 across the Wheatstone bridge of the selected translator to cause the meter to act as a galvanometer. Simultaneously with the operation of the key lever 87 into the "output" position, the button of the "Record" switch 91 is pushed inwardly. The meter will now indicate the depth of the water in inches of the tank whose number is illuminated.

When the foregoing operation takes place, the amount of water in the tank 1 acting upon the pressure diaphragm 6 will cause the produced pressure to be transmitted through the pressure tube 7 into the expansion pipe chamber 25 allowing the pressure to expand and act against the primary liquid column 98 to force the same through the restricted tube 27 and then into the manometer thereby causing the transmitted pressure to be stabilized to obviate any disturbing effect which might be produced by the violent agitation of water in the tank being measured. The transmitted pressure from the expansion pipe 24 is delivered by means of the primary liquid column 98 through the restricted pressure pipe 27 and then into the upper chamber of the manometer or mercury well 28. The pressure transmitted into the manometer is applied to the top surface of the mercury 30 by the liquid head 98, thereby causing the mercury to rise in the stand tube 31, to cause an upward movement of the auxiliary or quenching column 32 of the inert organic liquid, so that the auxiliary column 32 will move upwardly within the main tube 33 forming part of the Wheatstone bridge mechanism. The liquid 32 rises in the tube 33 and passes upwardly in the tube 40 around the wire 44 forming one of the legs of the Wheatstone bridge, the rise of the auxiliary column in the tube 40 being directly proportional to the pressure exerted by the water in the tank 1 on the diaphragm 6. The Wheatstone bridge wires 44 and 45, which are of equal length and form two of the arms of the Wheatstone bridge arrangement, will be heated, when the circuit is closed, due to the flow of current, but the wire 44 in the tube 40 will be quenched by the inert organic fluid 32 in amounts directly proportional to the depth of the liquid in the tank 1. The wire 45 in the tube 41, when heated, however, does not have the effective resistance thereof changed, since the wire is suspended in free air. The quenching or immersing of the wire 44 accordingly unbalances the normally balanced Wheatstone bridge circuit in an amount directly proportional to the pressure exerted on the control diaphragm due to the relative difference of the resistance of a heated wire in free air and a similar heated wire which is partially quenched. The change in resistance due to this phenomenon is accordingly adapted to be read on the galvanometer scale which will accurately indicate the depth or level of the liquid in the tank being measured.

When the tank 1 is full, the pressure exerted on the control diaphragm is such that the liquid column 98 acting on the mercury 30 will cause the same to rise in the tube 31 to the level indicated by the arrow G, at which point the upper end of the mercury column will engage the needle valve 35 (Figure 6) to seat the head of the valve against the valve seat 93 provided in the mounting base 34 of the tube 33, thereby effectively stopping any further rise of the mercury column. If the tank is filled to overflowing, the needle valve 35 will, of course, be closed as described, and the apparatus will cease to function.

The improved liquid depth indicating apparatus may be arranged for the measuring of a single tank or a plurality of tanks, and it is immaterial whether the tanks to be measured contain water, or a volatile fluid or liquid, since there is no danger as all of the electrical contacts are at a remote distance from the tanks being measured. By means of the remote control board and the selective dial unit 74, depth readings of the liquids in a plurality of tanks may be easily and quickly read on the indicating meter 82 in any selected sequence desired by a proper dialing of the instrument 74.

It will, of course, be understood that various details of construction and arrangement of the elements of the system may be varied through a wide range without departing from the principles of this invention, and it is therefore not the purpose to limit the patent granted hereon otherwise than necessitated by the scope of the appended claims.

What is claimed is:

1. In a liquid depth indicating system for indicating the depth of liquid in a tank, and with said system including a translator unit comprising a manometer, mercury in said manometer, a stand tube in the manometer and projecting therefrom and providing a guide for a column of the mercury, a pair of primary tubes fastened together in parallel relation with one of said primary tubes secured on the upper end of the stand tube, an upper column of an inert organic liquid supported on the mercury column and projecting up into the primary tube secured to the stand tube, and a Wheatstone bridge mechanism supported on the primary tubes and including a pair of secondary tubes telescoping into the primary tubes, a bridge arm wire in each of the secondary tubes and insulated therefrom, said wires being connected at their lower ends to the tubes in which they are mounted, an insulation spool mounted on the exterior of the primary tubes, a pair of bridge arm coils supported on the insulation spool and connected to the bridge wires in the secondary tubes, said bridge coil arms connected to one another, said column of inert organic liquid movable by the pressure actuated mercury column up into one of the secondary tubes to produce a quenching action on the bridge arm wire contained therein to vary the effective resistance of said bridge arm wire to unbalance the Wheatstone bridge for determining the depth of the liquid in the tank.

2. In a liquid depth indicating system for determining the depth of liquid in a tank and including a gas-filled closed diaphragm in the tank, a translator unit connected with the diaphragm to be actuated thereby, said translator unit comprising a manometer, an expansion tube connected at one end with the diaphragm, a restricted tube connecting the other end of the expansion tube with the manometer, a pressure transmitting liquid in the expansion tube, the restricted tube and in the manometer, a stand tube in the manometer and projecting therefrom, mercury in the manometer supporting said liquid and projecting upwardly into the stand tube to form a mercury supporting column, a pair of connected primary tubes one of which is rigidly supported on the stand tube, an inert organic liquid column supported on the mercury column and projecting up into the primary tube supported on the stand tube, a control valve in the upper end of the stand tube operable only by the mercury column into closed position to prevent the mercury column from entering the primary tube supported on the stand tube, and a resistance bridge mechanism supported on the primary tubes and including a pair of secondary tubes telescoped into the primary tubes, bridge arm wires in the secondary tubes with one of said wires disposed in the path of movement of the liquid column for varying the resistance of the bridge mechanism in accordance with the pressure delivered to the manometer, an insulation support mounted on the primary tubes, and a pair of connected bridge arm coils on the insulation support and connected with the bridge arm wires in the secondary tubes.

3. In a liquid depth indicating system for determining the depth of liquid in a tank and including a gas-filled closed diaphragm in the tank, a translator unit connected with the diaphragm to be actuated thereby, said translator unit comprising a manometer, an expansion tube connected at one end with the diaphragm, a restricted tube connecting the other end of the expansion tube with the manometer, a pressure transmitting means in said tubes and in the manometer, a stand tube in the manometer and projecting therefrom, mercury in the manometer supporting said means and projecting upwardly into the stand tube to form a mercury supporting column, a pair of connected primary tubes one of which is rigidly supported on the stand tube, an upper column of an inert organic liquid supported on the mercury column and projecting up into the primary tube supported on the stand tube, a control valve in the upper end of the stand tube operable only by the mercury column into closed position when the tank is full to prevent the mercury column from entering the primary tube supported on the stand tube, a resistance bridge mechanism supported on the primary tubes and including a pair of secondary tubes telescoped into the primary tubes, bridge arm wires in the secondary tubes with one of said wires disposed in the path of movement of the upper liquid column for varying the resistance of said wire to unbalance the bridge mechanism in accordance with the pressure delivered to the manometer, an insulation support mounted on the primary tubes, a pair of connected bridge arm coils on the insulation support and connected with the bridge arm wires in the secondary tubes, and means for adjusting and holding the secondary tubes in a set position of adjustment with respect to the primary tubes.

4. In a liquid level indicator system for indicating the level of liquid in a tank, and wherein a closed gas-filled bellows is placed on the bottom of the tank, a translator unit connected with the bellows and comprising a manometer including a mercury column, means connected between the manometer and the bellows for stabilizing the pressure delivered to the manometer, a resistance bridge mechanism supported on the manometer, and a secondary column of an inert organic liquid supported on the mercury column and operable therewith into resistance varying engagement with one of the arms of the resistance bridge mechanism to unbalance the bridge mechanism proportionately to the pressure exerted in the manometer for determining the level of the liquid in the tank.

5. In a liquid level indicating system for determining the depth of liquid in a tank and including a translator unit comprising a manometer casing, an expansion tube, a restricted tube connecting the expansion tube with the manometer casing, pressure transmitting means in said tubes and in the manometer, mercury in the manometer and supporting said means, a stand tube in the manometer and projecting therefrom for guiding a column of mercury, a pair of primary tubes secured together in parallel relation with one of the tubes secured on the upper end of the stand tube and the other tube being open at both ends, a column of organic liquid supported on the mercury column and projecting into the primary tube supported on the stand tube, a pair of connected secondary tubes telescoped into the primary tubes, means for holding the secondary tubes in a set position of adjustment with respect to the primary tubes, a high temperature coefficient of resistance wire in each of the secondary tubes and insulated from the tubes, said wires connected at their lower ends to the secondary tubes, one of said wires positioned to be acted upon by the column of organic liquid actuated by the mercury column to cause variation of the resistance of said wire, a bracket secured to the primary tubes, an insulation spool on said bracket, and a pair of connected wire coils on the insulation spool with one of said coils connected to one of the wires in one of the secondary tubes and the other coil connected with the wire in the other secondary tube.

6. In a liquid depth indicating system including a translator unit comprising a manometer, two sets of telescoping tubes supported on the manometer, a pressure actuated mercury column in the manometer, a secondary liquid column of an inert organic liquid supported on the mercury column and movable into two of the telescoping tubes, and a normally balanced electric resistance bridge supported by the telescoping tubes in position to have the resistance of one of the arms thereof varied by the action of the secondary column of liquid to unbalance the bridge.

7. A liquid depth indicating system for selectively measuring the depth of liquids in a plurality of tanks, said system including a plurality of closed gas-filled diaphragms one mounted within each of said tanks, a plurality of translator units mounted at a remote station, means for maintaining the translator units at a constant predetermined temperature, one of said diaphragm units for each of said translator units, each of said translator units including pressure operated superimposed columns of organic and metallic liquids, and a resistance bridge mechanism coacting with one of the organic liquid columns to be unbalanced thereby an amount proportionate to the pressure transmitted by the diaphragm connected with the translator unit, an automatic stepping switch unit connected with all of the translator units, a remote control unit connected with the automatic stepping switch unit and including means for selecting and indicating a tank to be measured for liquid depth, rheostats for normal energization of the resistance bridge mechanism of the selected translator unit for a selected tank, and means for then indicating the depth of liquid in the selected tank in accordance with the unbalancing of the resistance bridge mechanism due to the movement of one of the organic liquid columns into a resistance varying position with respect to the resistance bridge mechanism.

8. In a liquid depth indicating system for selectively determining the depth of liquid in a plurality of tanks, said system including a plurality of gas-filled closed diaphragms one mounted within each of said tanks, a plurality of translator units one for each of said diaphragms, each of said translator units including a manometer portion enclosing alternating organic and metallic liquid columns and an electric resistance bridge mechanism to have the resistance thereof varied by the action of one of the organic liquid columns; an automatic stepping switch unit connected with all of the translator units, and a remote control mechanism connected with the automatic stepping switch unit for selecting and indicating a particular tank to be measured for liquid depth and also including rheostat means for normally energizing the resistance bridge mechanism of a selected translator unit and then permitting the taking of the liquid depth reading of the selected tank in accordance with the unbalancing adjustment of the bridge mechanism of the translator unit by the action of the diaphragm actuated movement of the liquid columns in the selected translator unit.

9. In a liquid depth indicating system including in combination a translator unit comprising a manometer means containing a mercury column, a pressure stabilizing means connected with the manometer means, a four arm resistance bridge mechanism supported on the manometer means, and an organic liquid column supported on the mercury column for movement thereby into resistance varying engagement with one of the arms of the resistance bridge mechanism to unbalance a balanced setting of the bridge mechanism.

10. In a tank liquid depth indicating system wherein the pressure of the liquid in the tank is applied to a gas-filled diaphragm to be read on a liquid depth indicating means through the medium of a translator unit characterized by a balanced electric resistance means, a liquid guide container forming part of the translator unit, a column of a heavy metallic liquid and a column of a lighter organic liquid supported thereon within the container, a pressure transmitting and stabilizing means forming part of the translator unit and connected with the diaphragm to transmit a stabilized pressure to the heavy liquid column to move the same and actuate the lighter liquid column into coacting resistance varying engagement with the balanced electric resistance means to unbalance the same proportionate to the communicated pressure to cause an accurate liquid depth reading to be indicated on the indicating means of the system by preventing the metallic liquid column from contacting the resistance means.

11. In a liquid depth indicating system wherein liquid pressure is applied to a diaphragm and is transmitted through a tube to permit liquid depth readings to be read on a meter through the medium of a translator unit characterized by a manometer including a mercury column, pressure transmitting and stabilizing means on the manometer for stabilizing the pressure transmitted to the mercury column, an electric bridge mechanism supported on the manometer, an auxiliary column of an inert organic liquid supported on the mercury column for operation thereby to move the auxiliary liquid column into coacting engagement with the bridge mechanism to unbalance the same an amount proportionate to the communicated pressure exerted on the liquid columns to cause the meter to indicate the depth of liquid in the tank.

12. In a liquid depth indicating system wherein liquid pressure is applied to a diaphragm and is transmitted through a tube member to permit liquid depth readings to be read on a meter through the medium of an electric translator unit characterized by Wheatstone bridge resistance elements, a manometer means, a restricted tube connected with the manometer means, an expansion pipe connected with the restricted tube and with the tube member, an organic liquid in the expansion pipe, in the restricted tube and in the manometer means, mercury in the manometer means actuated by the organic liquid to transmit pressure from the diaphragm to produce a mercury column in the manometer means, an inert organic liquid column in the manometer means supported on the mercury column and movable thereby into coacting relationship with one of the resistance elements to change the resistance thereof an amount proportional to the communicated pressure, and rheostat means connected with the translator unit for setting the Wheatstone bridge resistance elements in a normal balanced state prior to the taking of a liquid depth reading on the indicating meter of the system.

13. In a liquid depth indicator system wherein the pressure of the tank liquid is applied to a diaphragm and is transmitted through a tube to a translator unit connected therewith and characterized by an expansion pipe connected with the pressure tube, a stabilizing liquid medium in the expansion pipe, a reduced diameter tube leading from the expansion pipe and filled with said liquid medium acting to stabilize the transmitted pressure, a manometer connected with the reduced diameter tube and also containing a quantity of the liquid medium, mercury in said manometer supporting the liquid medium, a stand pipe in said manometer and extending therefrom for receiving the mercury therein in the form of a column, a pair of joined parallel guide tubes one of which is supported on the stand pipe, an inert organic liquid column supported on the mercury column and extending up into the tube supported on the stand pipe, an electric resistance bridge supported by said parallel guide tubes, a source of electrical energy connected across two terminals of the bridge, a depth indicating meter connected across two other terminals of the bridge, and adjustable resistance means for energizing the bridge by using the meter as an ammeter, said inert organic liquid column movable by the pressure controlled mercury column into resistance varying engagement with the bridge to unbalance the bridge and permitting the meter to be used as a voltmeter to indicate the depth of liquid in the tank.

14. In a liquid depth indicator system wherein the pressure of the tank liquid is applied to a diaphragm and is transmitted through a tube to permit liquid depth reading to be read on a meter by means of a translator unit connected between the meter and the tube and characterized by a manometer, a pressure actuated column of metallic liquid therein, concentric columns of organic liquid supported on the metallic liquid column, a balanced electric bridge mechanism acted on by one of the organic liquid columns to vary the resistance thereof to unbalance the bridge mechanism an amount proportional to the pressure transferred by the diaphragm to the other of said organic liquid columns, and switch means for connecting the meter with the bridge mechanism to cause the meter to indicate the depth of liquid in the tank.

15. In a liquid depth indicator system of the class described wherein pressure applied to a diaphragm in a tank is transmitted to produce a liquid depth reading on a meter by means of a translator unit characterized by a pressure stabilizing means connected with the diaphragm, a liquid holder connected to said stabilizing means, a metallic liquid column in the holder, organic liquid columns in the holder separated by and supported on the metallic liquid column and operable by the transmitted stabilized pressure, and a resistance bridge supported on the holder and acted on by one of the organic liquid columns to unbalance the bridge an amount directly proportional to the pressure transmitted by the diaphragm to move all of said liquid columns to cause the meter to indicate the depth of liquid in the tank.

16. In a liquid depth indicating system for selectively determining the liquid depth of a plurality of tanks, one at a time and with said system including a plurality of gas-filled diaphragms one mounted on the bottom of each of said tanks, a plurality of translator units one for each of said diaphragms and operable by the pressure transferred by the respective diaphragms, a main stepping switch connected with all of the translator units, a remote control cabinet, a depth indicating meter therein, a plurality of signals in the cabinet one for each of the tanks, an auxiliary stepping switch in the cabinet connected with the signals and with the main stepping switch to the translator units for selectively indicating the tank selected for depth reading, and means in the cabinet for selectively connecting the translator units by means of the first mentioned stepping switch to the indicating meter for obtaining individual liquid depth readings for the tanks.

17. In a liquid depth indicating system for selectively determining the liquid depth of a plurality of tanks, one at a time, and with said system including a plurality of gas-filled diaphragms one mounted in each of the tanks, a plurality of translator units one for each of the diaphragms, means for connecting each translator unit with its respective diaphragm, a main stepping switch, means for connecting the same with all of the translator units, a remote control dial mechanism, a plurality of signals one for each of the tanks, an auxiliary stepping switch connected to and controlling the signals, means connected with the main stepping switch for indicating the depth of the liquid in the tank in which the selected diaphragm is located, means connecting said dial mechanism and said stepping switches, each of said translator units including a pressure actuated manometer, a Wheatstone bridge mechanism, and superimposed columns of metallic and organic liquids with one of said liquid columns coacting directly with a member of the bridge mechanism an amount proportional to the pressure transmitted to the manometer and the liquid columns therein.

MARY W. CONLEY,
*Executrix of the Estate of Victor H. Conley, Deceased.*